United States Patent [19]

Kusase et al.

[11] Patent Number: 5,726,511
[45] Date of Patent: Mar. 10, 1998

[54] ROTARY MACHINE HAVING WATER-RESISTANT STRUCTURE

[75] Inventors: Shin Kusase; Kenzou Mitani, both of Obu, Japan

[73] Assignee: Nippondenso Co., Ltd., Kariya, Japan

[21] Appl. No.: 651,930

[22] Filed: May 21, 1996

[30] Foreign Application Priority Data

May 29, 1995 [JP] Japan ................................ 7-130201

[51] Int. Cl.$^6$ .......................... H02K 7/18; H02K 5/173; F16C 19/08
[52] U.S. Cl. .......................... 310/90; 310/52; 310/59; 310/60 A; 318/477; 318/480; 318/484
[58] Field of Search .......................... 310/52, 59, 60 A, 310/90, 75 R, 78; 384/477, 480, 484

[56] References Cited

U.S. PATENT DOCUMENTS

| | | |
|---|---|---|
| 5,194,770 | 3/1993 | Yoshioka et al. .................. 310/51 |
| 5,334,097 | 8/1994 | Tatara et al. ...................... 476/8 |
| 5,423,304 | 6/1995 | Lawrence et al. ................ 123/559 |

FOREIGN PATENT DOCUMENTS

| | | |
|---|---|---|
| 231785 | 8/1987 | European Pat. Off. |
| 503503 | 9/1992 | European Pat. Off. |
| 2667460 | 4/1992 | France |
| 2693514 | 1/1994 | France |
| 3025735 | 2/1982 | Germany |
| 5-22897 | 1/1993 | Japan |
| 2205693 | 12/1988 | United Kingdom |
| 2268546 | 1/1994 | United Kingdom |

*Primary Examiner*—Steven L. Stephan
*Assistant Examiner*—Trann N. Nguyen
*Attorney, Agent, or Firm*—Cushman Darby & Cushman IP Group of Pillsbury Madison & Sutro LLP

[57] ABSTRACT

A labyrinth formed between a pulley and a housing of a rotary machine such as an alternator is arranged to have a plurality of differently-shaped air gaps. When the size of a first air gap between a belt guide of the pulley is $\delta 1$, the size of a second air gap formed between a cylindrical base portion of the pulley and a bearing box of the housing is $\delta 2$, a third air gap formed between a front wall and a flange portion of the bearing box is $\delta 3$ and a fourth air gap formed between a boss portion and a bearing seal member is $\delta 4$, the air gap is arranged to satisfy the following inequality: $\delta 1 < \delta 2$, $\delta 2 > \delta 3$, $\delta 3 > \delta 4$.

10 Claims, 5 Drawing Sheets

ROTARY MACHINE HAVING WATER-RESISTANT STRUCTURE

CROSS REFERENCE TO RELATED APPLICATION

The present application is based on and claims priority from Japanese Patent Applications No. Hei 7-130201, filed on May 29, 1995, the contents of which are incorporated herein by reference.

BACKGROUND OF THE INVENTION

1. Field of the Invention

The present invention relates to a rotary machine which is driven by a driving power source such as an engine through a belt and, more particularly, relates to a water-resistant structure of an alternator for a vehicle.

2. Description of the Related Art

U.S. Pat. No. 5,194,770 (which corresponds to JA-A-4-140042) discloses an alternator for a vehicle which is equipped with a labyrinth between the V-pulley and the housing to prevent water coming into the housing through the shaft.

However, the labyrinth of the alternator disclosed in the above publication is too simple to prevent water from entering the housing if the alternator is mounted under the engine of a vehicle which has no under-cover, where the alternator is subject to splashing of water or mud, resulting in decrease of the bearing life. Even if a sealed bearing, which has sealing members on opposite sides of the bearing between the outer race fixed to the housing and the inner race fixed to the rotating shaft, is adopted, water may enter the inside through gaps between the sealing member which is fixed to the outer race and the inner race (the gap for allowing rotation of the inner race), resulting in shortening the ball-bearing life.

Especially, if water including an antifreeze electrolyte (such as salt or acetate) splashes the alternator after it stops rotation, the water remains inside the bearing. As a result, the electrolyte-including mud forms a bridge across the bearing and the pulley, or across the aluminum housing and the iron pulley thereby forming a local cell and producing corrosive materials.

Consequently, water drainage becomes poorer, the inside of the bearing gets wetter and more water remains in the bearing.

SUMMARY OF THE INVENTION

The present invention has an object of providing an improved rotary machine which can prevent water from entering the inside of a bearing through a sealing member, thereby increasing life time of the bearing.

A further object of the present invention is to provide a rotary machine in which drainage of water from a labyrinth or an air gap formed between the pulley and the housing prevents water from entering the inside of the bearing through the seal member.

In addition, another object of the present invention is to provide a rotary machine in which corrosive materials is not produced even if water enters the inside of the bearing.

Further object of the present invention is to provide a rotary machine in which gaps may not form between the bearing box and the outer periphery of the bearing.

The rotary machine according to the present invention comprises a housing having a front wall and a bearing box for supporting an outer race of a bearing having a sealing member, and a bowl-shaped rotating member, such as a pulley, having a cylindrical base portion disposed around the bearing box, a boss portion fixed to a rotary shaft and an annular portion connecting the cylindrical base portion and the boss portions, thereby forming an air gap between the rotating member and the housing extending from an opening portion to the bearing. The air gap has four different air gaps: a first air gap formed between the rear end of the cylindrical base portion and the front wall, a second air gap formed between an inner periphery of the cylindrical base portion and the bearing box, a third air gap formed between the rear surface of the annular portion and the front surface of the bearing box and a fourth air gap formed between the rear surface of the boss portion and the front surface of the sealing member. They are formed to satisfy the following inequality: $\delta1<\delta2$, $\delta2>\delta3$, $\delta3>\delta4$ when the first air gap is $\delta1$, the second air gap is $\delta2$, the third air gap is $\delta3$ and the fourth air gap is $\delta4$.

That is, the first air gap near the opening is formed as a narrow space, the second air gap adjacent to the first air gap is formed wider than the first air gap, the third air gap adjacent to the second air gap is formed as a narrow space, and the fourth air gap adjacent to the third air gap is formed narrower than the third air gap.

As a result, water entering the fourth air gap is easier to move to the third air gap, which is wider than the fourth air gap, than to move to the bearing through the sealing member. The water in the third air gap is also easier to move to the second air gap, which is wider than the third air gap, than to move to the fourth air gap. The water in the second air gap is easier to move to the first air gap than to move to the third air gap. Even if water enters the air gap between the pulley and the housing, the water is more apt to flow to the first air gap near the opening than to flow to the fourth or third air gap near the bearing, thus the water is prevented from entering the bearing to keep the normal life time of the bearing.

The air gap may comprise a first air gap formed between the rear end of the cylindrical base portion and the front wall, a second air gap formed approximately perpendicular to the first air gap between the inner periphery of the cylindrical base portion and the bearing box, a third air gap formed approximately perpendicular to the second air gap between the rear surface of the annular portion and the front surface of the bearing box and a fourth air gap disposed spaced apart from and in parallel with the third air gap between the rear end of the boss portion and the front surface of said sealing member.

That is, the air gap from the first air gap near the opening of the air gap through the second and third air gaps which are located at middle portions to the fourth air gap near the bearing is bent so that the water is prevented from rushing to the fourth air gap near the bearing from the first air gap near the opening straightly. As a result, since the water may not get in the bearing through the seal member, decrease in the life time of the bearing can be prevented.

The outer race of the bearing is preferably press-fitted into the bearing box. That is, the outer periphery of the bearing support is formed smooth so that the second air gap formed between the inner periphery of the outer cylindrical portion of the pulley and the front surface of the bearing support of the housing can be formed into a cylindrical shape having a uniform axial length. Accordingly, the water can flow from the second air gap to the first air gap near the opening straightly.

The bearing box preferably has a retaining portion for retaining the outer race of the bearing from the front end and radial size of the fourth air gap is preferably larger than that of a fifth air gap formed between the rear surface of the inner peripheral portion of the retaining portion and the front surface of the sealing member. Since the fourth air gap is formed wider than the fifth air gap thereby to hold the water getting into the fourth air gap rather by the inner cylindrical portion than by the retaining portion, the water held by the inner cylindrical portion is thrown out by centrifugal force during rotation of the pulley.

The inner periphery of the cylindrical base portion has preferably an inclination so that an opening-side diameter of the second air gap becomes larger than a bottom-side diameter. Therefore, the centrifugal force causes the water in the second air gap to flow to the first air gap near the opening straightly.

The bearing box and the rotating member are preferably made of the same kind of metal. Accordingly, such corrosive material may not be produced even if salt water gets into the second or third air gap.

The outer race of the bearing and the bearing box are also preferably made of the same kind of metal. Therefore, gaps otherwise generated by difference in the thermal expansion are prevented from forming between the outer periphery of the bearing and the bearing support portion.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Preferred embodiments of the present invention of the generators are described in connection with vehicle alternators hereafter.

Figure 1:
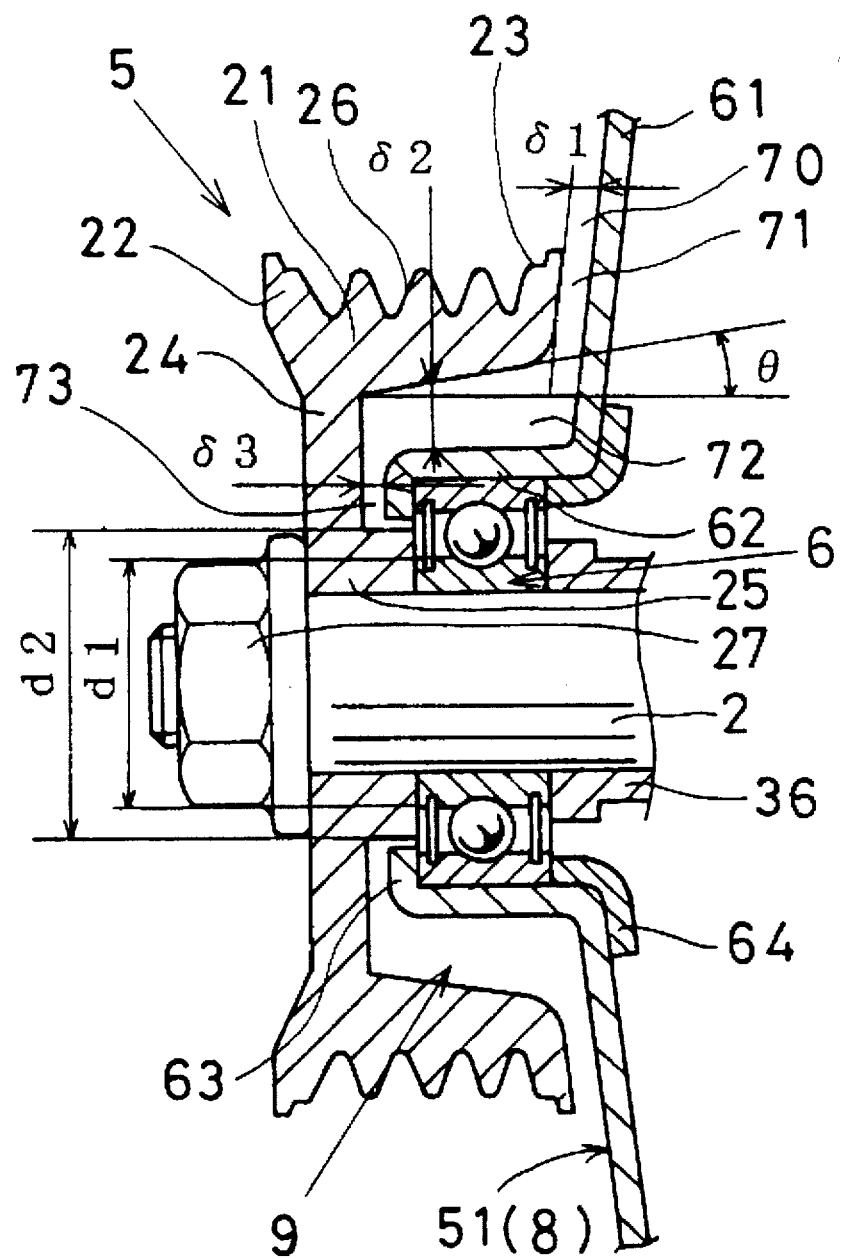
FIG. 1 is a cross-sectional side view illustrating a main portion of a vehicle alternator according to a first embodiment.
Figure 2:
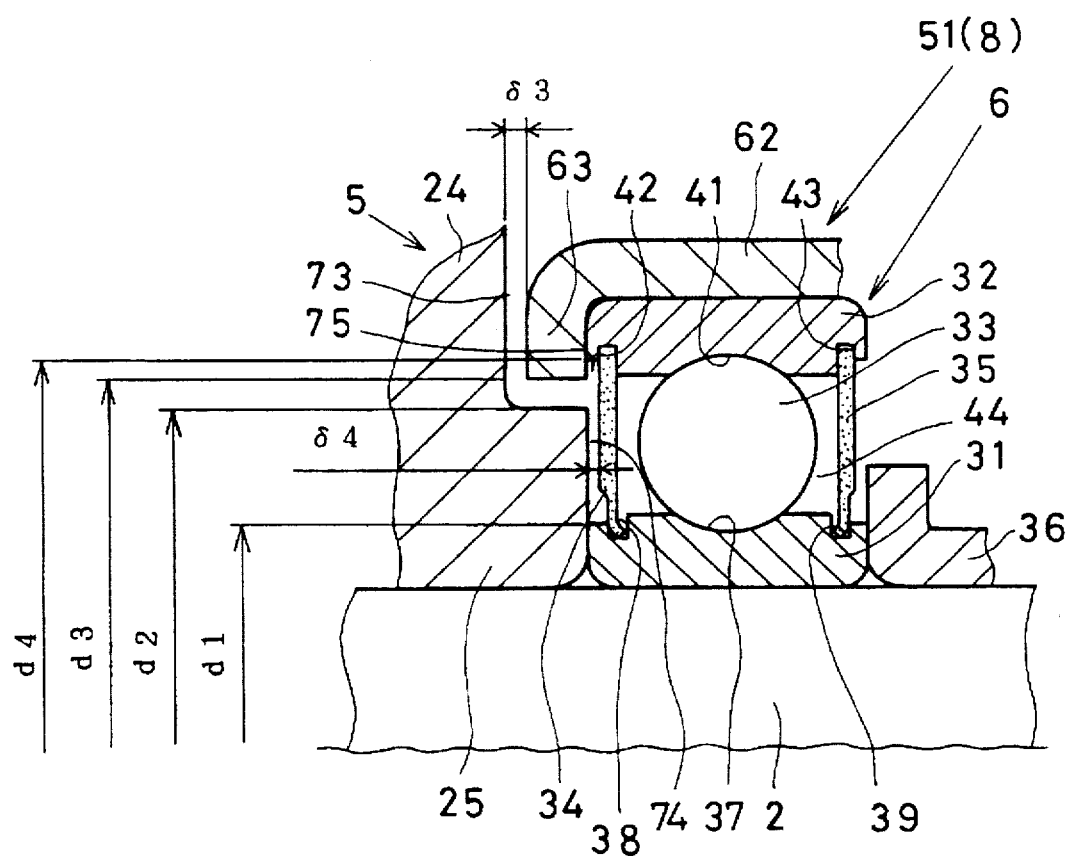
FIG. 2 is a cross-sectional side view illustrating a main portion of the vehicle alternator according to the first embodiment.
Figure 3:
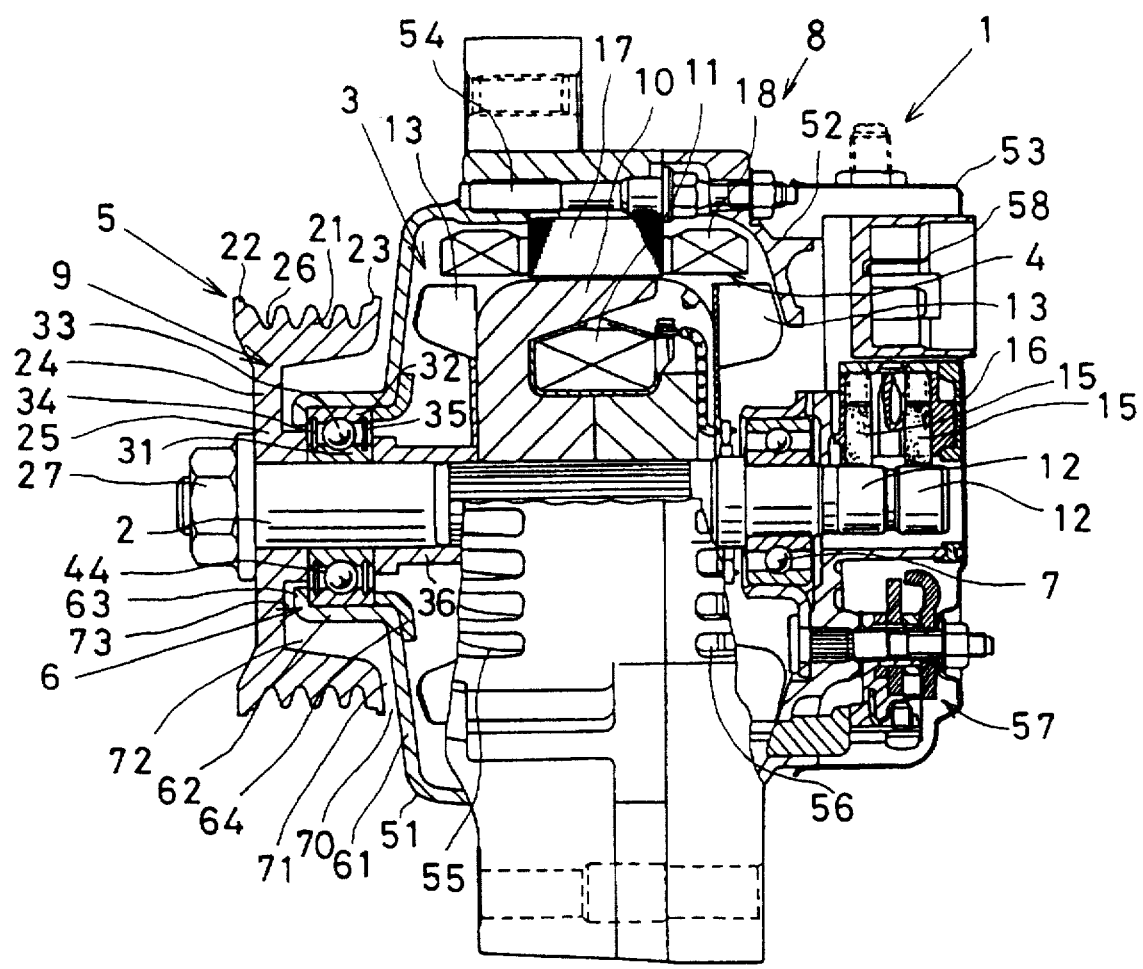
FIG. 3 is a cross-sectional side view illustrating an overall vehicle alternator according to a first embodiment.

FIG. 1 and FIG. 2 illustrate a main structure of a vehicle alternator and FIG. 3 illustrates an overall structure of the vehicle alternator.

The vehicle alternator 1 is a rotary machine according to the present invention. The vehicle alternator 1 is composed of a shaft 2, a rotor 3 rotatable with the shaft 2, a stator 4 disposed around the rotor 3, a V-ribbed pulley 5, two ball bearings 6 and 7, a housing 8 rotatably supporting the shaft 2 through the ball bearings 6 and 7. An air gap (labyrinth or water passage) 9 is formed between the V-ribbed pulley 5 and the housing 8.

The rotor 3 is composed of a Lundel-type pole core 10, a field coil 11 and two slip rings 12. The pole core 10 has a plurality of claw portions each of which extends alternately from opposite sides of the pole core in parallel with each other. Cooling fans 13 are fixed to the opposite ends of the pole core 10 respectively to draw cooling air into the housing 8. The field coil 11 is wound in a bobbin 14 which is disposed in the middle of the pole core 10. Each one of the slip rings 12 is secured to an end of the shaft 2 and disposed to be in contact with one of two brushes 15 at the peripheries thereof respectively. The brushes 15 are held in a brush holder 16 secured inside the housing 8.

The stator 4 is composed of a stator core 17 disposed around the pole core 10 and three-phase armature windings (or stator coils) 18. The armature core 17 is a laminated core of thin magnetic plates and press-fitted into the housing 8. The armature core 17 is provided with magnetic flux passages so that the magnetic flux flowing from the claw portions of the pole core 10 can effectively interlink the three-phase armature windings 18. A plurality of slots (not shown) are formed at an equal interval in the inner periphery of the armature core 17. The three-phase armature windings 18 are connected in the Y or Δ-connection mode to generate three-phase AC output power when the rotor 3 rotates.

The V-ribbed pulley 5 is a pulley for a poly-V belt, that is, a member of a transmitting unit for transmitting the engine driving force to the rotor 3 through the poly-V belt (not shown). The V-ribbed pulley 5 is made of flat metal plate of iron material (such as low-carbon steel), which is press-formed into a bowl unit. The V-ribbed pulley 5 is composed of an outer cylindrical base portion 21, two belt guides 22 and 23 disposed opposite ends of the base portion 21, an annular portion 24 extending inwardly from an edge of the base portion 21 and a boss portion 25 disposed at the center thereof.

The base portion 21 is an approximately cylindrical member having a plurality of V-shaped groove 26 for receiving a poly-V belt on the outer periphery thereof. The base portion 21 has an inner surface inclined at an angle θ (1 20 . for example) with the diameter of the opening portion of the air gap being larger than the diameter of the bottom as shown in FIG. 2. The base portion 21 of the V-ribbed pulley 5 according to this embodiment has the inner diameter of about 50 mm. The V-shaped grooves 26 are formed by a forming roller.

The belt guides 22 and 23 prevent the poly-V belt from running off the V-ribbed pulley 5 and also the water shelter (water-resistant member) which prevents water from entering the ball bearing 6 as described later. The annular portion 24 is an annular plate for connecting the edge of the base portion 21 and an end of the boss portion 25.

The boss portion 25 is approximately cylindrical member extending longitudinally from the inner periphery of the annular portion 24 and is connected to an end of the shaft 2 by a nut-and-washer 27. The boss portion 25 is disposed in contact with the ball bearing 6 to restrict the axial movement of the ball bearing 6a and prevents water from entering the bearing 6.

The ball bearing 6 is a two-side sealed ball bearing which is composed of an inner race 31, an outer race 32, a plurality of balls 33 and two bearing seal members 34 and 35.

The inner race 31 is fixed to the outer periphery of a portion of the shaft 2 between the boss portion 25 of the V-ribbed pulley 5 and the pole core 10 of the rotor 3 and is rotated together with the shaft 2. One end of the inner race 31 is disposed in contact or engagement with the rear end of the boss portion 25 so that the axial movement of the shaft 2 can be retained.

The inner race 31 engages an end of the pole core at the rear end thereof through a space collar 36 to restrain the axial movement of the shaft 2. The inner race 31 has a plurality of hemispherical hollows 37 on the outer periphery thereof to accommodate the balls 33 rotatably and grooves 38 and 39 on the opposite sides of the hollows 37 to retain slidably the bearing seal members 34 and 35.

The outer race 32 is disposed around the inner race 31 which is press-fitted into an inner periphery of a bearing box 62 of the housing 8 without specific fastening member. The front end of the outer race 32, as shown in FIG. 2 and FIG. 3, engages a rear end of a flange portion 63 of the bearing box 62 to restrain the axial movement of the shaft 2.

The rear end of the outer race 32 engages the front end of a retainer plate 64 to restrain the axial movement of the shaft 2. The outer race 32 has a plurality of hemispherical hollows 41 on the inner periphery thereof to accommodate the balls 33 rotatably with the hollows 37 of the inner race 31 and grooves 42 and 43 on the opposite sides of the hollows 41 to retain slidably the bearing seal members 34 and 35 with the grooves 38 and 39 of the inner race 31. The retainer plate 64 is fixed to an inner portion of the housing 8 by welding or another fixing member.

The balls 33 can be replaced with rollers or the like members. The bearing seal members 34 and 35 are annular iron plates molded with resinous rubber for preventing water from entering the inside 44 of the bearing 6.

The housing 8 is composed of a drive-side frame 51, a rear frame 52 and a rear cover 53. The drive-side frame 51 and the rear frame 52 hold the rotor 3 and the stator 4 and are mounted in an engine.

The drive-side frame 51 and the rear frame 52 are directly coupled together by a plurality of stud bolts 54. A plurality of cooling air window are opened in the drive-side frame 51 and the rear frame 52 respectively to introduce cooling air drawn by both cooling fans 13. The brushes 15, a rectifying unit 57 and output terminals (not shown) are fixed between the rear frame 52 and a rear cover 53. The brush holder 16, the rectifying 57 and an IC regulator 58 are secured by fastening members such as screws.

The rectifying unit 57 is composed of a plurality of diodes (not shown) for converting AC current into DC current. The rectifying unit 57 is connected to electric loads and a battery (not shown) mounted on a vehicle.

The IC regulator 58 turns on or off a switching element such as a transistor connected between the field coil 11 and an earth (not shown) to control the field current supplied to the field coil, thereby regulating the output voltage of the vehicle alternator 1.

The drive-side frame 51 is press-formed from a plate of iron material (such as low-carbon steel) to have an annular front wall 61 disposed to face the rear belt guide 23 of the base portion 21 of the V-ribbed pulley 5 and the bearing box 62 which extends axially forward from an inner end of the end wall 61.

The bearing box 62 has a cylindrical portion disposed longitudinally between the base portion 21 of the V-ribbed pulley 5 and the outer race 32 of the ball bearing 6. The bearing box 62 has an inner periphery to which the outer race 32 of the ball bearing 6 is press-fitted.

The approximately annular flange portion 63 is formed at the forward end of the bearing box 62 to support the outer race 32 of the ball bearing 6. The flange portion 63 is disposed to face the bearing seal member 34 to restrain the axial movement of the outer race 32 of the ball bearing 6 with the retainer plate 64 which is fixed by spot welding or the like to an inner surface of the drive frame 51.

The air gap 9 is a space extending from an opening 70 and the bearing seal member 34 and is formed of a first to fifth air gaps 71–75.

The first air gap 71 is located near the opening 70 between the rear surface of the belt guide 23 of the V-ribbed pulley 5 and a front surface of the front wall 61 of the drive-side frame 51 and is an annular flat space which inclines backward at a certain angle.

The second air gap 72, as shown in FIG. 1, is a middle space adjacent to the first air gap 71 which bents in a direction approximately perpendicular to the first air gap 71. The second air gap 72 is formed between the inner periphery of the base portion 21 of the V-ribbed pulley 5 and the outer periphery of the bearing box 62 and is an approximately cylindrical space extending in parallel with the shaft 2. The second air gap 72 has longer axial extension than the first and third to fifth air gaps 73–75 have.

The third air gap 73 is a middle space adjacent to the second air gap 72, as shown in FIG. 1 and FIG. 2, and bends in a direction perpendicular to the second air gap 72. The third air gap 73 is located between the rear end surface of the annular portion 24 of the V-ribbed pulley 5 and the front surface of the flange portion 63 of the bearing box 62 and is an annular flat space extending in the radial direction of the shaft 2.

The fourth air gap 74 is, as shown in FIG. 2, a space adjacent to the third space 73 near the bearing seal member 34 (inmost side) and is located spaced apart from and in parallel with the third air gap 73. The fourth air gap 74 is located between the rear end surface of the boss portion 25 of the V ribbed pulley 5 and a radially inner front surface of the bearing seal member 34 and is an annular flat space extending in the radial direction of the shaft.

The fifth air gap 75, as shown in FIG. 2, is a space adjacent to the third air gap 73 located near the bearing seal member 34 (inmost side) in parallel with the third air gap 73 at a certain distance and coaxially around the fourth air gap 74. The fifth air gap 75 is located between the rear surface of the flange portion 63 of the bearing box 62 and a radially outer front surface of the bearing seal member 34 and is an annular flat space extending in the radial direction of the shaft 2.

Assuming that the longitudinal distance of the first air gap 71 is $\delta 1$, the radial distance of the second air gap 72 is $\beta 2$, the longitudinal distance of the third air gap 73 is $\delta 3$, the longitudinal distance of the fourth air gap is $\delta 4$ and the longitudinal distance of the fifth air gap is $\delta 5$, the distances are decided to satisfy the following inequalities E1 through E3.

[E1]
$$\delta 1 \leq \delta 2$$
[E2]
$$\delta 2 > \delta 3$$
[E3]
$$\delta 3 > \delta 4$$

According to this embodiment, $\delta 1$ is about 1.2 mm, $\delta 2$ is about 3.0 mm, $\delta 3$ is about 0.2 mm, and $\delta 5$ is about 0.2 mm.

If the radial size of the fourth air gap 74 is (d2–d1) and the radial size of the fifth air gap 75 is (d4–d3), the radial size is decided to satisfy the following inequality E4.

{E4}
$$(d4-d3)<(d2-d1)$$

Operation of the First Embodiment

Operation of the vehicle alternator 1 according to the first embodiment is described briefly with reference to FIG. 1–FIG. 4.

When driving force of the engine is transmitted through a V-belt to the V-ribbed pulley 5, the shaft rotates to thereby rotate the rotor 3. The field coil 11 is supplied with the field current from the battery to excite the claw pole portions of both sides of the pole core 10. A rotating magnetic field is supplied to the armature core 17 of the stator 4 which rotates relative to the rotor and AC current is generated in the three-phase armature windings 18. The three-phase AC current is converted into DC current by the rectifying unit 57, which is supplied to the battery and to the electric loads for the vehicle.

The vehicle alternator 1 is mounted at a place under the engine in general. If the vehicle has no under cover, the alternator is subject to splash of muddy water, which may enter the ball bearing 6 behind the bearing seal member 34 through the air gap 9 formed between the V-ribbed pulley 5 and the drive-side frame 51.

However, the vehicle alternator according to this embodiment has an air gap 9 which is composed of the narrow first air gap near the opening 70, the widest second air gap 72 adjacent to the first air gap 71, and the third air gap 73 which is adjacent to the second air gap 72 and is narrower than the second air gap. In addition, the fourth air gap 74 adjacent to the third air gap 73 and the fifth air gap 75 adjacent to the third air gap 73 are narrower than the third air gap 73. As a result, water entering the second air gap 72 through the first air gap 73 from the opening 70 of the air gap 7 can not enter the inmost side of air gap 9 and is drained toward the opening 70 because the third gap 73 through the fifth air gap 75 are narrower than the second air gap 72.

Since the respective passage between the first to third space gaps 71–73 are bent or the fourth and fifth air gaps 74 and 75 are placed in parallel with the third air gap 73, water can not rush directly into the fourth air gap 74 and fifth air gap 75 near the bearing seal member 34.

Conventionally, the bearing box 62 used to have outer thick portions (four portions, for example) for providing screw holes to retain the outer race 32 of the ball bearing 6 by screws, rendering the second air gap 72 narrower. However, according to the first embodiment, since the outer race 32 of the ball bearing 6 is press-fitted to the inside of the bearing box 62, the outer race 32 can be fixed without a fastening member, so that the outer portion of the bearing box 62 becomes straight without undulations.

That is, the outer portion of the bearing box 62 can be made approximately cylindrical shape having a smooth surface so that the second air gap formed between the inner surface of base portion 21 of the V-ribbed pulley 5 and the front surface of the bearing box 62 of the drive-side frame 51 can be formed into a longitudinally straight cylindrical space. Accordingly, water getting into the second air gap 72 drains off easily to the opening 70.

Since the inner periphery of the base portion 21 of the V-ribbed pulley 5 forming the outer periphery of the second air gap 72 inclines at a certain angle θ (1°) so that the inside diameter of the opening 70 becomes larger than the inside diameter of the bottom portion of the second air gap 72, water getting into the second air gap 72 is drained by the centrifugal force out of the opening 70.

In addition, in regard to the bearing seal member 34 fixed to the outer race 32, the boss portion 25 of the V-ribbed pulley which is a rotating wall forming the fourth air gap 74 with the bearing seal member 34 is radially wider than the wall of the flange portion 63 which is a stationary wall forming the fifth air gap 75 with the bearing seal member 34. Accordingly, water getting into the fourth air gap 74 is apt to adhere more to the boss portion 25 than to the flange portion 63 so that the water adhering to the boss portion 25 is rotated and thrown out by the centrifugal force from the fourth air gap 74 to the opening 70.

Therefore, water can be prevented from rushing into the bearing seal member 34 straightly from the opening 70. In addition to the drainage of the water adhering to the inner periphery of the base portion 21 and the rear surface of the boss portion 25 by the centrifugal force, the drainage of the water in the air gap 9 between the V-ribbed pulley 5 and the drive frame 51 can be carried out through the opening 70 by increasing or reducing the spaces of the air gap 9 (especially increase of the second air gap 72). Thus, water is prevented from entering the ball bearing 6 through the bearing seal member 34 so that life time of the ball bearing 6 can be increased.

Since the bearing box 62 and the V-ribbed pulley 5 are made of the same kind of iron material, even if a small quantity of water including some electrolyte enters the second or the third air gap, the electrolyte-including water may not form a bridge between the bearing box 62 and the V-ribbed pulley 5 and, consequently, the local cell may not be formed thereby preventing corrosive materials from forming inside the bearing seal member 34 of the ball bearing 6. Thus, water is kept from entering the inside the bearing seal member 34 of the bearing 6.

When the vehicle alternator 1 operates, the outer race 32 of the ball bearing 6 and the bearing box 62 are heated by the alternator 1 and expand. Since the outer race 32 of the ball bearing 6 and the bearing box 62 are made of the same kind of iron material, gaps due to difference in the thermal expansion does not form between the outer race 32 of the bearing 6 and the bearing box 62. Since the drive-side frame 51 is press-formed from iron material, burrs are scarcely formed as compared with what is casted.

Test Result of the First Embodiment

Figure 4:
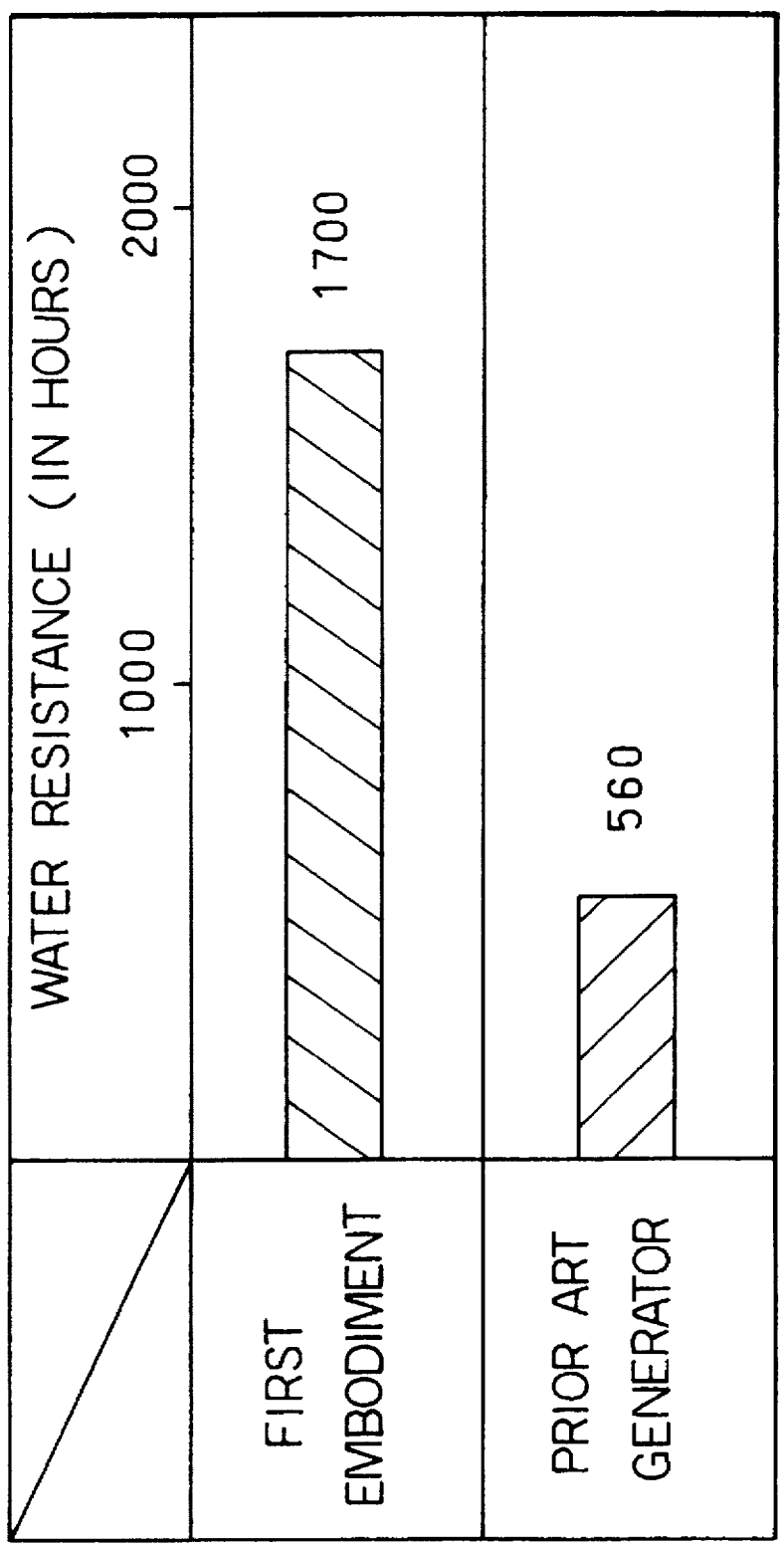
FIG. 4 is a graph comparing salt resistance of the first embodiment with that of a conventional alternator after a salt spray test.

In order to compare the vehicle alternator according to the first embodiment with a conventional vehicle alternator, salt spray test, in which salt water (electrolyte-including water) is sprayed on all sides of the alternator, is applied. FIG. 4 shows a test result when the salt water of 350 cc is sprayed on the respective alternators (the first embodiment and the conventional alternator) running at 4,000 rpm for 15 seconds every one minute through sixty nozzles of 1.2 mm in diameter.

It is noticed from FIG. 4 that the vehicle alternator 1 according to the first embodiment has the salt resistance of 1700 hours, which is three times as long as the salt resistance of 560 hours which the conventional alternator has.

Second Embodiment

Figure 5:
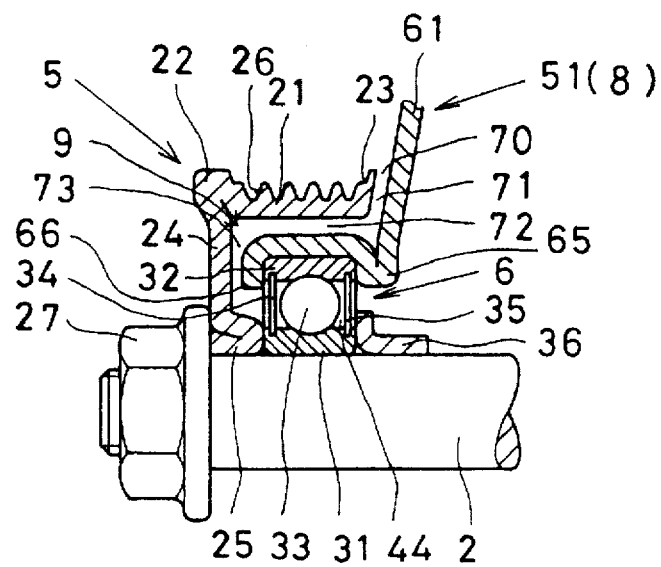
FIG. 5 is a cross-sectional side view illustrating a main portion of a vehicle alternator according to a second embodiment.

FIG. 5 shows a main portion of a vehicle alternator according to a second embodiment. In this embodiment, the V-ribbed pulley 5 is press-formed or roller-formed from a plate made of an iron material.

In this embodiment, the ball bearing 6 is inserted into the bearing box 62 of the drive-side frame 51 until it abuts a front surface of a folded portion 65 of the bearing box 62 and is fixed by a retaining portion 66 at the front surface of the outer race 32. The outer periphery of the ball bearing 6 becomes round and the cross-section thereof becomes cylindrical also in this case. Since the outer race 32 is held between the folded portion 65 and the retaining portion 66, no retainer plate 64 of the first embodiment is necessary.

Since the retaining portion 66 renders an axial measurement of the bearing box 62 accurate, the third air gap 73 can be formed accurately. Accordingly, the axial distance δ3 of the third air gap 73, or the axial distance between the rear surface of the annular portion 24 of the V-ribbed pulley 5 and the front surface of the retaining portion 66 of the bearing box 62 can be reduced, thereby, to shelter the ball bearing 6 from water effectively.

Third Embodiment

Figure 6:
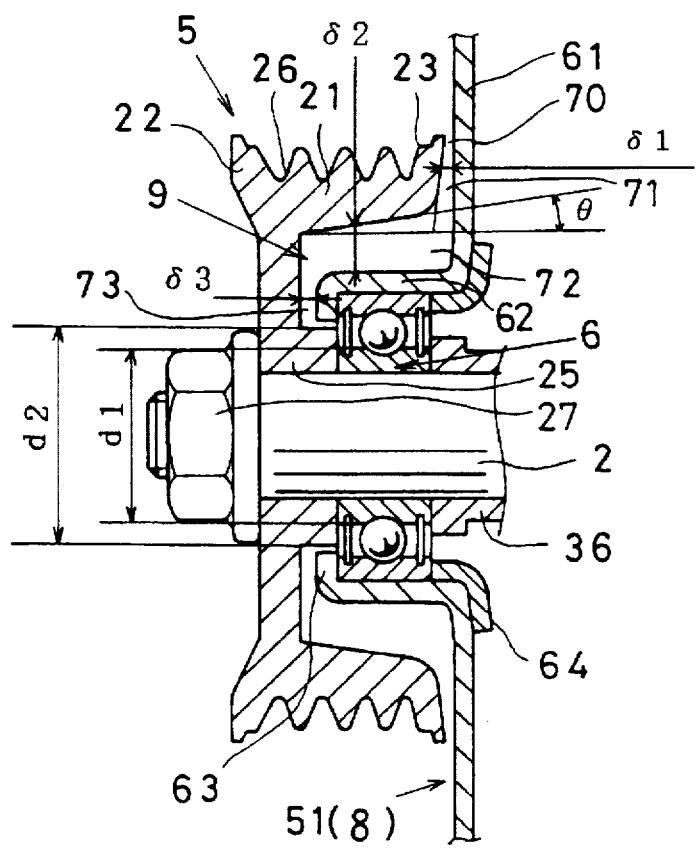
FIG. 6 is a cross-sectional side view illustrating a main portion of a vehicle alternator according to a third embodiment.

FIG. 6 shows a main part of an vehicle alternator according to a third embodiment of the present invention. In this embodiment, the belt guide 23 of the V-ribbed pulley 5 and the front wall 61 of the drive-side frame 51 are disposed axially in parallel with each other to be perpendicular to the shaft 2. Accordingly, the first air gap 71 becomes an annular flat space which is disposed on the same axis as the opening 70.

Therefore, since the first air gap 71 is formed into an annular flat space, the rear surface of the belt guide 23 of the V-ribbed pulley 5 and the front wall 61 of the drive-side frame 51 are located in an approximately flat space which is disposed radially outside the shaft 2. As a result, water entering the first air gap 71 drops straight away without entering the ball bearing 6, increasing effect of sheltering water from the bearing.

Variation

While the previous embodiments of the present invention are applied to a vehicle alternator driven by an engine through a poly-V-belt, the present invention can be applied to an AC or a DC generator driven by a motor, a water wheel of a wind wheel. The present invention can be also applied to a rotary machine such as a motor, a compressor or a rotary pump.

In the previous embodiments, the V-ribbed pulley 5 with the poly-V-belt is used. V-pulley with a single V-groove can be used also. The V-ribbed pulley can be also replaced with a rotating member such as a gear or the like.

In the previous embodiments, the shaft 2 and the V-ribbed pulley 5 are separately formed. However, they can be formed in a unit. The inner race 31 of the ball bearing 6 can be formed integral with the shaft 2. The outer race 32 of the ball bearing 6 can be formed integral with the bearing box 62 also. On the other hand, the front wall 61 can be separated from the bearing box also. The flange portion 63 can be separated from the bearing box too.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A rotary machine comprising:

a housing having a front wall and a bearing box extending forward from said front wall;

a rotary shaft;

a bearing having an outer race fitted into said bearing box, an inner race receiving said rotary shaft and a sealing member on an end thereof; and a bowl-shaped rotating member having a cylindrical base portion disposed around said bearing box, a boss portion fixed to a front end of said rotary shaft and an annular portion connecting said cylindrical base portion and said boss portion, wherein said front wall of said housing is disposed to face a rear surface of said cylindrical base portion, said bearing box is disposed between said cylindrical base portion and said bearing to form an air gap between said rotating member and said housing; and said air gap is formed to satisfy the following inequality: $\delta1<\delta2$, $\delta2>\delta3$, $\delta3>\delta4$ when a first air gap formed between said rear surface of said cylindrical base portion and said front wall is $\delta1$, a second air gap formed between an inner periphery of said cylindrical base portion and said bearing box is $\delta2$, a third air gap formed between a rear surface of said annular portion and a front surface of said bearing box is $\delta3$ and a fourth air gap formed between a rear surface of said boss portion and a front surface of said sealing member is $\delta4$; wherein said bearing box comprises a retaining portion facing said sealing member for retaining said outer race of said bearing from one axial end, and a radial size of said fourth air gap is larger than a radial size of a fifth air gap formed between a rear surface of said front end of said retaining portion and a front surface of said sealing member.

2. A rotary machine as claimed in claim 1, wherein said second air gap is formed perpendicular to said first, third and fourth air gaps and has a cylindrical space whose axial size is larger than any one of said first, third and fourth air gaps.

3. A rotary machine as claimed in claim 1, wherein said outer race of said bearing is press-fitted into said bearing box.

4. A rotary machine as claimed in claim 1, wherein said bearing box and said rotating member are made of the same kind of metal.

5. A rotary machine as claimed in claim 1, wherein said outer race of said bearing and said bearing box are made of the same kind of metal.

6. A rotary machine as claimed in claim 1, wherein said first air gap is formed into an annular plate shape.

7. A rotary machine as claimed in claim 1, wherein said cylindrical base portion of said rotating member has a plurality of roller-formed V-shaped grooves; and said bearing box is made from a press-formed metal plate.

8. A rotary machine as claimed in claim 1, wherein said inner periphery of said cylindrical base portion is inclined so that a rear-side diameter of said second air gap becomes larger than a front-side diameter thereof.

9. A rotary machine comprising:

a housing having a front wall and a bearing box extending forward from said front wall;

a rotary shaft;

a bearing having an outer race fitted into said bearing box, an inner race receiving said rotary shaft and a sealing member on an end thereof; and a bowl-shaped rotating member having a cylindrical base portion disposed around said bearing box, a boss portion fixed to a front end of said rotary shaft and an annular portion connecting said cylindrical base portion and said boss portion, a rear surface of said boss portion covering at least a portion of said sealing member to drain water adhering thereto by centrifugal force; wherein said front wall of said housing is disposed to face a rear surface of said cylindrical base portion and said bearing box is disposed between said cylindrical base portion and said bearing to form an air gap between said rotating member and said housing; and said air gap is formed to satisfy the following inequality: $\delta_1 < \delta_2$, $\delta_2 > \delta_3$, $\delta_3 > \delta_4$ when a first air gap formed between said rear surface of said cylindrical base portion and said front wall is $\delta_1$, a second air gap formed between an inner periphery of said cylindrical base portion and said bearing box is $\delta_2$, a third air gap formed between a rear surface of said annular portion and a front surface of said bearing box is $\delta_3$ and a fourth air gap formed between said rear surface of said boss portion and a front surface of said sealing member is $\delta_4$, wherein said inner periphery of said cylindrical base portion is inclined so that a rear-side diameter of said second air gap becomes larger than a front-side diameter thereof.

10. A generator comprising:

a housing having a front wall and a bearing box extending forward from said front wall;

a rotary shaft;

a bearing having an outer race fitted into said bearing box, an inner race receiving said rotary shaft and a sealing member on an end thereof; and a bowl-shaped rotating member having a cylindrical base portion disposed around said bearing box, a boss portion fixed to a front end of said rotary shaft and an annular portion connecting said cylindrical base portion and said boss portion, a rear surface of said boss portion covering at least a portion of said sealing member to drain water adhering thereto by centrifugal force; wherein said front wall of said housing is disposed to face a rear surface of said cylindrical base portion, said bearing box of said housing is disposed between said cylindrical base portion and said bearing to form an air gap between said rotating member and said housing, and said air gap comprises a first air gap formed between said rear surface of said cylindrical base portion and said front wall, a second air gap formed approximately perpendicular to said first air gap between an inner periphery of said cylindrical base portion and said bearing box, a third air gap formed approximately perpendicular to said second air gap between a rear surface of said annular portion and a front surface of said bearing box and a fourth air gap disposed spaced apart from and in parallel with said third air gap between said rear surface of said boss portion and a front surface of said sealing member.

wherein said bearing box comprises a retaining portion facing said sealing member for retaining said outer race of said bearing from one axial end, and a radial size of said fourth air gap is larger than a radial size of a fifth air gap formed between a rear surface of said end of said retaining portion and said front surface of said sealing member.

* * * * *